United States Patent [19]
Cole

[11] 4,074,158
[45] Feb. 14, 1978

[54] ELECTRIC MOTOR ASSEMBLY

[76] Inventor: James D. Cole, 1651 S. San Luis, Green Valley, Ariz. 85614

[21] Appl. No.: 686,309

[22] Filed: May 14, 1976

[51] Int. Cl.² .......................................... H02K 5/00
[52] U.S. Cl. ..................................... 310/90; 277/80
[58] Field of Search ................ 310/90, 40 MM, 172, 310/162, 163, 67, 164; 308/72, 191, 210; 277/80

[56] References Cited

U.S. PATENT DOCUMENTS

| 2,904,709 | 9/1959 | Lautner | 310/90 |
| 3,319,098 | 5/1967 | Hartman | 310/90 |
| 3,387,153 | 6/1968 | Grad | 310/90 |
| 3,483,409 | 12/1969 | Phillips | 310/90 |
| 3,701,912 | 10/1972 | Schulze | 310/90 |
| 3,749,954 | 7/1973 | Anderson | 310/90 |
| 3,777,191 | 12/1973 | Papst | 310/67 |
| 3,786,290 | 1/1974 | Papst | 310/90 |
| 3,914,071 | 10/1975 | Friese | 310/90 |

FOREIGN PATENT DOCUMENTS 921,123   12/1954   Germany .............................. 277/80

Primary Examiner—R. Skudy
Attorney, Agent, or Firm—Hill, Gross, Simpson, Van Santen, Steadman, Chiara & Simpson

[57] ABSTRACT

An electric motor assembly has a stator assembly provided with a stator winding and an adjacent air gap aperture. A support member is provided at one end of the air gap aperture for positioning a non-rotatable rotor shaft in the air gap aperture. A rotor assembly has a central aperture in which first and second bearing are positioned. Each bearing is seated at one end against a beveled portion at an end of the rotor central aperture. The other end of each bearing is retained and biased against the beveled portion by a retaining spring secured to the rotor assembly. The first and second bearing rotatably engage the rotor shaft and permit the rotor assembly to rotate about the rotor shaft in the air gap aperture.

13 Claims, 9 Drawing Figures

U.S. Patent  Feb. 14, 1978  Sheet 1 of 2  4,074,158
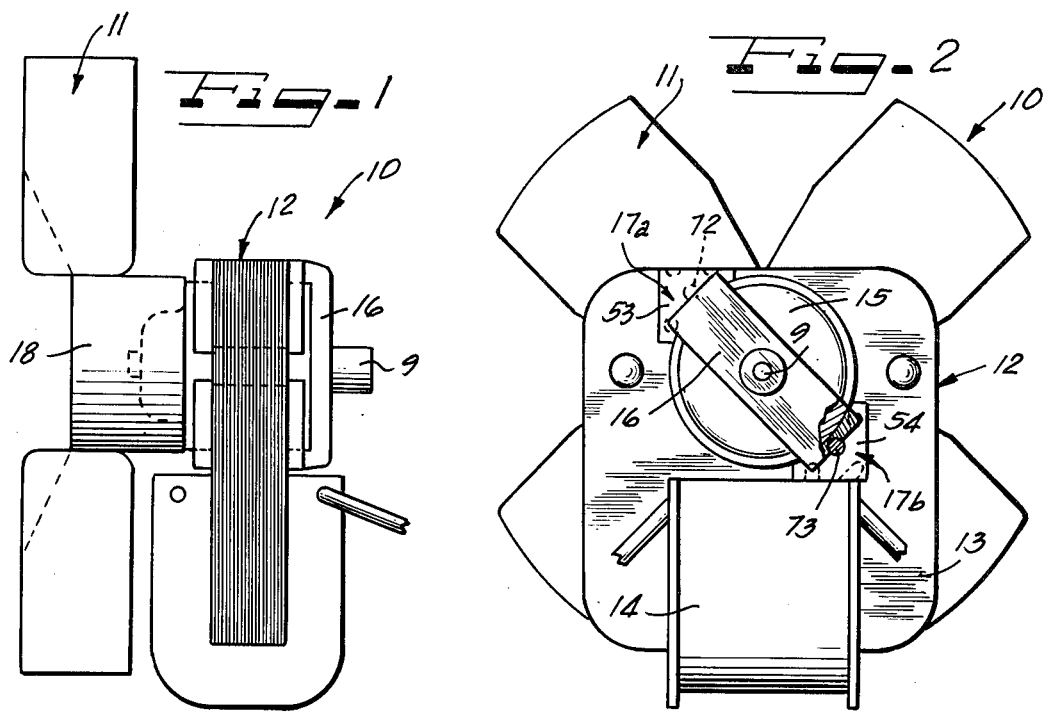
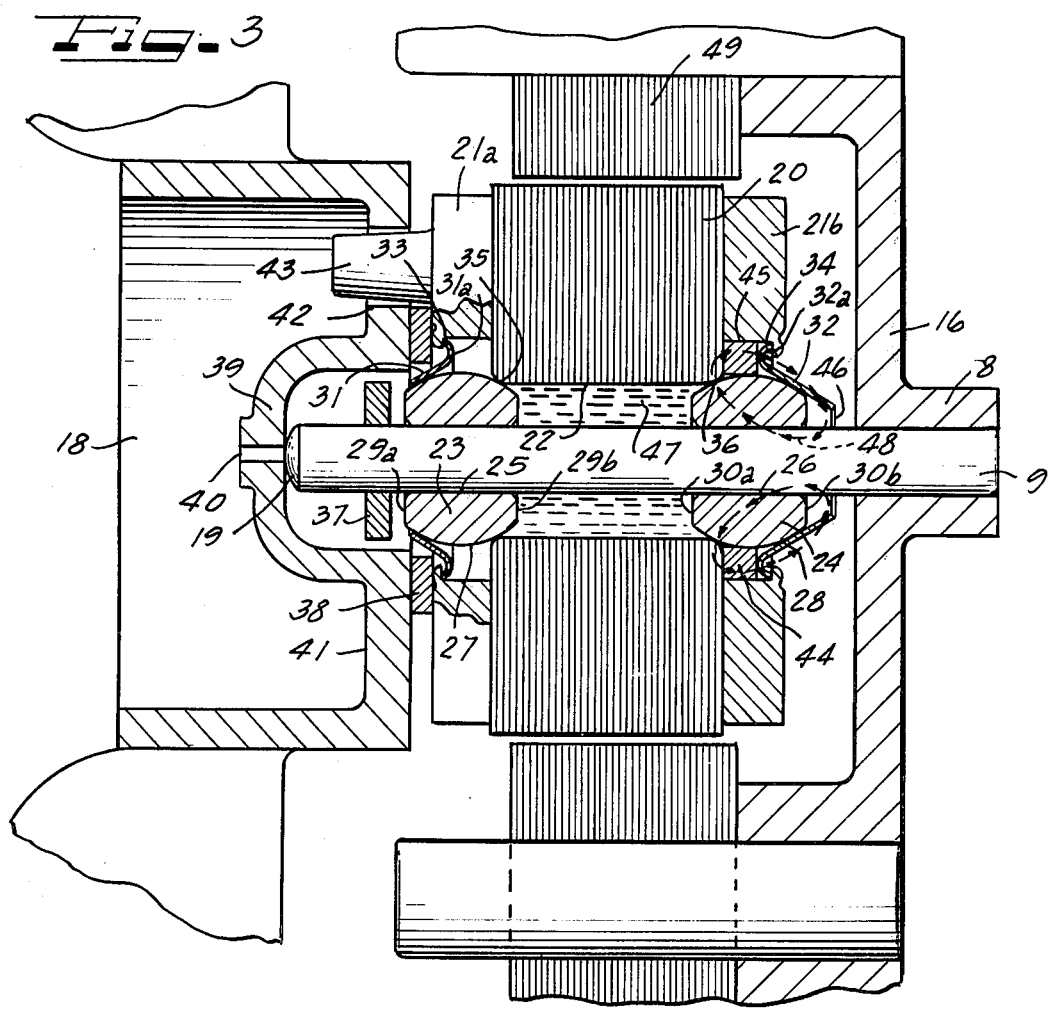

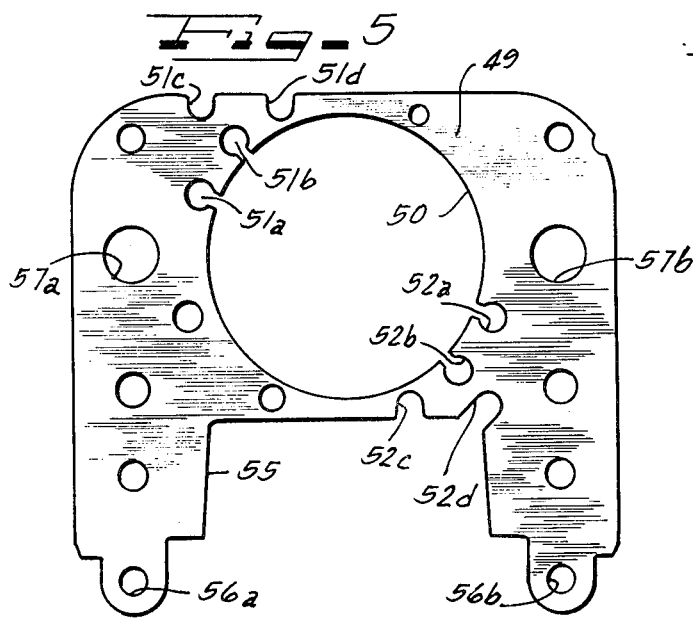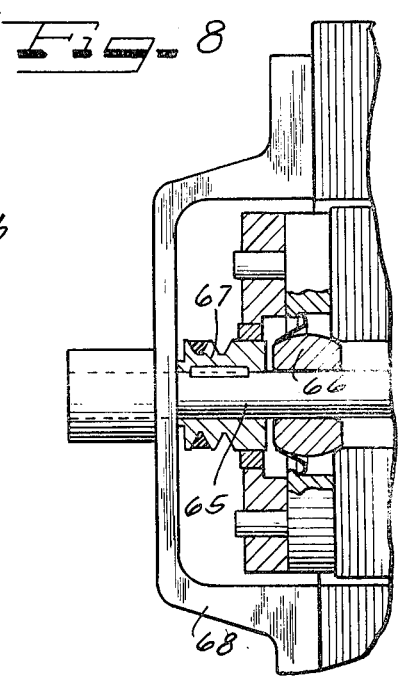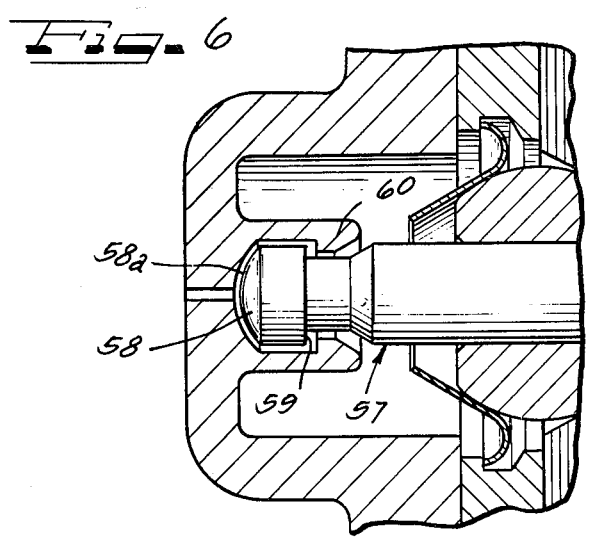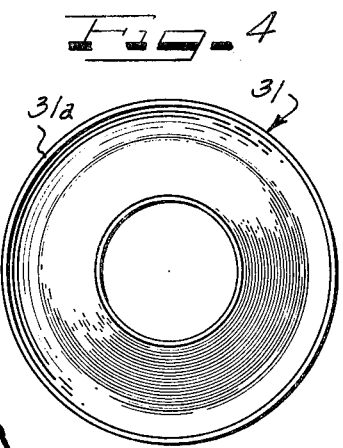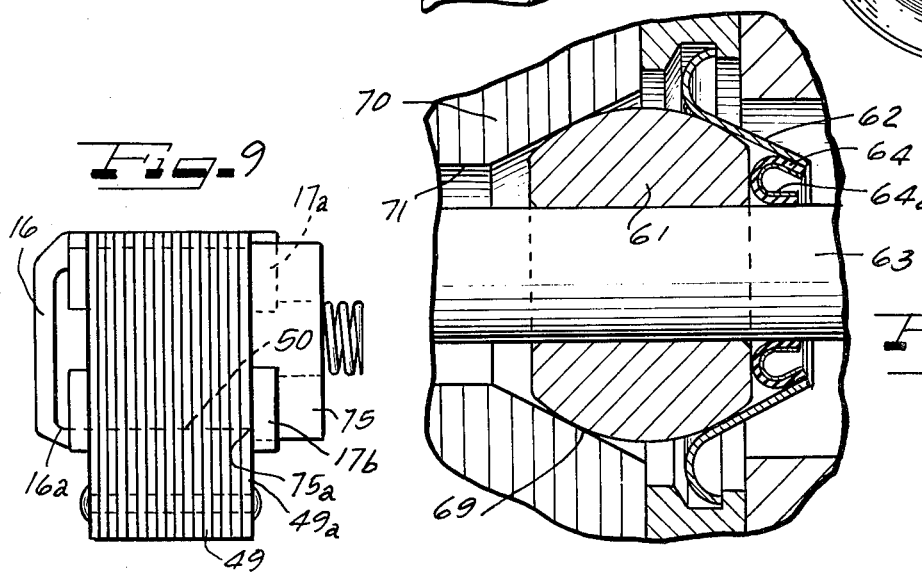

ELECTRIC MOTOR ASSEMBLY

BACKGROUND OF THE INVENTION

1. Field of the Invention

This invention relates to an electric motor assembly and more particularly to an improved bearing system and shading coil system for electric motors.

2. Description of the Prior Art

Previous motor assembly structures of the "unit bearing type," in which bearings were formed as a single unit, provided the advantage of self-alignment but at high labor and material costs. Also, prior art electric motor assemblies with shading coils have coils formed with conventional copper wire and such construction does not result in ideal magnetic coupling between the shading coils and the stator laminations. The concept of casting shading coils to an electric motor stator is old, however the use of a bearing system as taught by this invention in combination with cast shading coils is not known in the prior art.

SUMMARY OF THE INVENTION

It is an object of this invention to produce a mounting structure for an electric motor which is inexpensive, is adapted to high production manufacturing techniques, and results in lower noise level and energy requirements.

A further object of this invention is to provide an electric motor assembly which occupies less space and uses less material.

Another object of this invention is to provide a motor assembly in which mounting members for the central rotor may be cast at the same time as shading coils and other motor attachments so as to reduce costs.

It is a further object of this invention to provide a structure in which a dual bearing system is provided which is self-aligning yet has all of the advantages of a unit bearing system.

In accordance with the present invention, an electric motor assembly has a stator assembly with a stator winding and an adjacent air gap aperture. A support member on the stator assembly is positioned at one end of the air gap aperture to non-rotatably support a rotor shaft which is aligned in the air gap aperture. A rotor assembly having end portions on either end of a central lamination portion, has a central aperture in which first and second bearing means are positioned. Each of the bearing means is seated at one end against the circular seating portion in the central aperture at an end of the lamination portion. Each of the bearing means is then retained at the other end by a circular retaining spring having a circular lip portion which engages a notch in one of the end ring portions. The rotor assembly with the first and second bearing means is then positioned onto the rotor shaft to rotatably engage the same.

BRIEF DESCRIPTION OF THE DRAWINGS

FIG. 1 is a side view of the electric motor and fan combination of this invention;

FIG. 2 is a plan view of the electric motor and fan assembly of this invention;

FIG. 3 is a fragmentary cross sectional view of the rotor assembly and bearing support assembly for the electric motor of this invention;

FIG. 4 is a plan view of the bearing retaining springs of this invention;

FIG. 5 is a plan view of a stator lamination for the motor of the invention;

FIG. 6 is a fragmentary cross sectional view illustrating an alternate embodiment for connecting the hub of a fan and rotor to the motor of this invention;

FIG. 7 is a fragmentary cross sectional view illustrating an alternate lubrication seal at the bearing means for the motor of this invention;

FIG. 8 is a fragmentary cross sectional view illustrating a fan belt drive member connected to the motor of this invention; and FIG. 9 is a cross sectional view of a stator illustrating lamination assembly with a locking pin.

DESCRIPTION OF THE PREFERRED EMBODIMENTS

An electric motor and fan assembly according to this invention is generally shown at 10 in FIGS. 1 and 2. A fan blade 11 is attached to a fan blade hub 18 and is driven by a motor 12. The motor 12 has a stator 13, a stator winding 14, and a rotor assembly 15. A supporting member 16 is attached to the stator below the rotor assembly and supports a central stationary rotor shaft 9.

As shown in FIG. 3, the supporting member 16 has a collar 8 for non-rotatably mounting the rotor shaft 9. The shaft 9 is comprised of hardened steel and has a convex polished end 19 which functions as a thrust bearing.

The rotor assembly 15 comprises a portion 20 comprising a plurality of stacked laminations and has top and bottom cast aluminum end rings 21a,b. A central aperture 22 in the rotor assembly 15 has positioned therein upper and lower bearings 23 and 24 in the shape of truncated spheres. Aperture 25 in bearing 23 and aperture 26 in bearing 24 form the bearing surfaces between the rotor assembly 15 and stationary shaft 9 when the bearings are aligned on shaft 9. The bearings 23 and 24 have convex outer surfaces 27 and 28. The upper and lower bearings 23 and 24 have upper and lower end surfaces 29a,b and 30a,b respectively.

The upper and lower bearings 23 and 24 are biased against upper and lower bearing seats 35 and 36 by upper and lower bearing retaining springs 31 and 32. The bearings may be constructed of either ferrous or nonferrous materials such as powered iron, iron-bronze or bronze.

As shown most clearly in FIG. 4, the bearing retaining springs 31 or 32 are circular and each are provided with upturned lips 31a and 32a. These upturned lips engage upper and lower circular notches, or grooves, 33 and 34 in end rings 21a and 21b, respectively or the end rings 21a and 21b are staked over at 33 and 34. The upper and lower bearing seats 35 and 36 are formed by rounded corners at the ends of the central aperture 22 and the rotor assembly 15.

Hub 18 is connected to fan blades 11, and has a conical thrust bearing member 39 against which polished end 19 of the rotor shaft 9 abuts. A lubricating and venting aperture 40 permits lubrication to flow to the contact point between the end 19 and the conical member 39 and allows air pressure equalization to the atmosphere. A mounting surface 41 of the hub 18 mounts the fan blades and a gasket 38 to the rotor assembly 15 of the motor at the end ring 21a. For reverse thrust, a locking ring 37 is provided below the thrust bearing end 19 of the rotor 9. This locking ring abuts against end portion 29a of the upper bearing 23. One or more centering pins or attachment means 43 align and lock the hub 18 to the rotor assembly 15.

To retain lubricating fluid within the central aperture 22 of the rotor assembly 15, a magnetic seal is provided directly below the lower bearings 24. The magnetic seal is formed by providing a magnetic circuit or flux path 48 with a circular magnet 44 mounted adjacent the bearing outer convex surface 228 in a notch or groove 45. A magnetic seal occurs at 46 because a lubricating fluid 47 containing magnetic particles is introduced into aperture 22. Adjacent the end of the spring 32, the iron particles in the fluid are subjected to the magnetic field between the spring 32 and shaft 9 which causes the lubrication fluid 47 to become more viscous in this region. The magnet 44 is magnetized in a longitudinal direction to provide the proper flux.

As shown in FIG. 5, a single stator lamination 49 is formed of soft iron and has an air gap aperture 50 for receiving the rotor assembly 15. Interior slots 51a and 51b are provided together with exterior slots 51c and 51d. These slots are provided for receiving during casting a melted aluminum which forms a shading coil 17a. Similarly, a shading coil 17b is formed by cast aluminum in interior slots 52a,b and exterior slots 52c,d. As shown most clearly in FIG. 2, die cast aluminum plates 53 or 54 connect with the cast aluminum in slots 51a-d or 52a-d at the top and bottom portions of the stator assembly 13. A pin 72, positioned in slot 52d, or a pin 73, positioned in slot 51c, are an integral part of the plate castings 53 or 54. A cut-out portion 55 is provided to accept the stator winding 14. Apertures 56a,d on either side of the cut-out portion 55 are provided for rivets which bind together the stack of laminations 49.

The motor of this invention is assembled as follows: As shown in FIG. 9 the stator of the motor of this invention is assembled by pressing a pin 75 through the air gap bore 50 of a stack of laminations 49. This pin is just enough larger than the bore 50 to stretch the annealed steel of the laminations 49 within their elastic limit. This rotor bore pin 75 is provided with a shoulder at 75a which seats against the top lamination 49a. The opposite end of this pin provides the shape inside supporting bracket 16 at 16a. This pin as an insert to hold the laminations together in handling prior to casting is inserted in the casting die with the laminations and pressed out of the laminations after casting. The pin which is of a close tolerance, precise diameter and having no taper or draft in the portion engaging the laminations, was found to be essential to the successful manufacture of the stator of this invention. Laminations inserted into casting dies where the central pin engaging the bore 50 was an integral part of the die could not be made to produce acceptable parts. If the fit of this pin was loose enough and provided draft enough the shading coils flashed out of slots 51a, b, c and d to lock the part in the die. If the fit in the die was tight the cold laminations could not be inserted over the hot and expanded pin in the die. Since the laminations 49 are very soft, any pressure to remove them from a die after casting resulted in distorted and useless parts. Also the casting operation was slowed down to no longer be economical.

With the pin at the same temperature as the laminations no trouble was experienced. The die cavities to produce the shading coil end plates 53 and 54 and supporting bracket portion 16 are made with adequate draft so that no sticking problems are encountered.

The rotor laminations are cast using a central pin staked in the shaft hole 22. The end rings 21a and 21b are cast including projections for fastening. Bearing seats 35 and 36 can either be machined or formed in a staking operation. Notches 33 and 34 can be machined at the same time as seats 35 and 36 or the retaining springs can be secured by a staking operation after bearings 23 and 24 are assembled over a pre-aligning pin central to the rotor and 0.0001 inches over the final shaft size.

In the case of the lower bearing 24, the circular magnet 44 is placed around the bearing 24 prior to engagement of spring 32. The rotor assembly 15 is then slipped over the stationary shaft 19 and a locking ring 37 is placed around the shaft 9. Fan blades 11 are then attached via hub 18 to the rotor assembly 15.

During assembly and operation, bearings 23 or 24 are not radially distorted since they are captivated longitudinally rather than radially as in the prior art. Consequently, the motor runs quieter and with greater efficiency. Furthermore, the use of the cast aluminum shading coils permits the use of less copper on the main exciting coil. This results from the improved magnetic coupling between the cast shading coil and the stator laminations as compared to the conventional copper wire shading coil construction.

An alternate embodiment for attachment of a fan hub is shown in FIG. 6. The stationary rotor shaft 57 has a top portion 58 with a convex surface 58a which functions as a thrust bearing. A lower ledge 59 of the top portion 58 is engaged by hooks 60 on the fan blade hub. Consequently, locking is achieved for either forward or reverse thrust direction without the use of a locking ring.

FIG. 7 illustrates an alternate embodiment for a lubrication seal for the bearings of this invention together with an alternate arrangement for seating the bearings. At the bottom end of a lower bearing 61, a sealing ring 64 such as Teflon (registered U.S. Trademark) is formed about the stationary rotor shaft 63. Sealing ring 64b has a U-shaped cross section and is provided with a metal back-up portion 64a. The outer convex surface of the bearing 61 is biased by the spring 62 against a large bevelled surface 69 formed at a corner of the rotor laminations 70 at an end of a central aperture 71 of the rotor 70.

FIG. 8 illustrates a belt drive member 67 on a stationary shaft 65 adjacent a bearing 66. A support member 68 locks the shaft 65 in position. A drive belt may then be provided as a mechanical link between the motor and an element to be driven such as a fan blade.

Although various minor modifications may be suggested by those versed in the art, it should be understood that I wish to embody within the scope of the patent warranted thereon, all such embodiments as reasonably and properly come within the scope of my contribution to the art.

I claim as my invention:

1. An electric motor assembly comprising:
   (a) a stator assembly having a stator winding and an adjacent air gap aperture, and a support member on said stator assembly at one end of said air gap aperture;
   (b) a rotor shaft non-rotatably mounted to said support member and aligned in said air gap aperture;
   (c) a rotor assembly having laminations and a central aperture in the laminations, first and second self-aligning bearing means positioned in said central aperture, each bearing means having a curved surface seated at one end against a seating portion formed on the laminations at an end of said central aperture and retained at the other end by a retaining spring abutting a curved surface of the bearing means, said first and second bearing means rotatably engaging said rotor shaft.

2. The motor assembly of claim 1 in which said first and second bearing means comprise the approximate shape of a sphere having truncated end portions and a central aperture for rotatably engaging said rotor shaft.

3. An electric motor assembly comprising:
 (a) a stator assembly having a stator winding and an adjacent air gap aperture, and a support member on said stator assembly at one end of said air gap aperture;
 (b) a rotor shaft non-rotatably mounted to said support member and aligned in said air gap aperture;
 (c) a rotor assembly having a central aperture, first and second bearing means positioned in said central aperture, each bearing means being seated at one end against a seating portion of said central aperture and retained at the other end by a retaining spring, said first and second bearing means rotatably engaging said rotor shaft; and
 (d) said retaining spring having a circular shape with an upturned lip, an end of said lip being seated in a notch on the sidewall of said rotor assembly central aperture.

4. The motor assembly of claim 3 in which said seating portion of said central aperture is a bevelled surface at one end of said rotor assembly central aperture.

5. The motor of claim 3 in which said seating portion of said central aperture is coined to a smooth annular radius in said rotor assembly central aperture.

6. The motor assembly of claim 1 in which a lubricating fluid seal is positioned adjacent one of said bearing means and comprises a magnetic circuit utilizing a ring magnet and said retaining spring to attract metal particles in a lubricating fluid.

7. The motor assembly of claim 1 in which a lubricating fluid seal comprising a circular and flexible member having a U-shaped cross section is positioned adjacent one of said bearing means.

8. The motor assembly of claim 1 in which a fan hub is attached to said rotor assembly, said hub having a thrust bearing portion in abutment with an end portion of said rotor shaft, a locking ring also being provided on said rotor shaft between said rotor shaft end portion and one of said bearing means.

9. The motor assembly of claim 1 in which a fan hub is attached to said rotor assembly, said rotor shaft having a top portion having a thrust bearing surface and a ledge, said hub abutting said thrust bearing surface and having hook means for engaging said ledge.

10. The motor assembly of claim 1 in which a belt drive member is slidably engaged on said rotor shaft and fastened to said rotor assembly.

11. The motor assembly of claim 1 in which shading coils are provided on said stator assembly comprising die cast aluminum strips formed in gaps adjacent the stator air gap aperture.

12. The motor of claim 1 in which said retaining spring has a circular shape with an upturned lip, an end of said lip being secured by staking an end portion of said rotor over the end of said lip.

13. An electric motor assembly comprising:
 (a) a stator assembly having a stator winding, an adjacent air gap aperture, and a support member on said stator assembly at one end of said air gap aperture;
 (b) a rotor shaft non-rotatably mounted to said support member and aligned in said air gap aperture;
 (c) a rotor assembly having end ring portions with a lamination portion therebetween, a central aperture, first and second bearing means positioned in said central aperture, each bearing means being seated at one end against a circular seating portion at an end of said lamination portion and retained at the other end by a circular retaining spring having a circular lip portion engaged in a notch of one of said end ring portions, said first and second bearing means rotatably engaging said rotor shaft.

* * * * *